(12) United States Patent
Venable

(10) Patent No.: US 6,738,154 B1
(45) Date of Patent: May 18, 2004

(54) LOCATING THE POSITION AND ORIENTATION OF MULTIPLE OBJECTS WITH A SMART PLATEN

(75) Inventor: Dennis L. Venable, Marion, NY (US)

(73) Assignee: Xerox Corporation, Stamford, CT (US)

(*) Notice: Subject to any disclaimer, the term of this patent is extended or adjusted under 35 U.S.C. 154(b) by 1003 days.

(21) Appl. No.: 08/785,109

(22) Filed: Jan. 21, 1997

(51) Int. Cl.[7] .............................................. G06F 15/00
(52) U.S. Cl. ...................... 358/1.15; 358/540; 358/450; 358/452; 358/453
(58) Field of Search ................................ 395/114, 116, 395/117; 707/520, 521; 382/199, 201, 202, 203, 209, 282, 284, 294, 318, 164, 165; 358/450, 452, 453, 540, 528

(56) References Cited

U.S. PATENT DOCUMENTS

| | | | |
|---|---|---|---|
| 4,181,952 A | 1/1980 | Casey et al. ................. | 364/515 |
| 4,649,498 A | 3/1987 | Kedem et al. ............... | 364/518 |
| 4,922,350 A | 5/1990 | Rombola et al. ............ | 358/488 |
| 4,922,543 A | 5/1990 | Ahlbom et al. .............. | 382/48 |
| 5,220,398 A | 6/1993 | Horn et al. .................. | 356/152 |
| 5,253,765 A | 10/1993 | Moorehead et al. ........ | 209/539 |
| 5,267,333 A * | 11/1993 | Aono et al. .................. | 358/450 |
| 5,289,570 A * | 2/1994 | Suzuki ......................... | 358/450 |
| 5,440,403 A | 8/1995 | Hashimoto et al. ......... | 358/444 |
| 5,448,376 A * | 9/1995 | Ohta ............................ | 358/448 |
| 5,485,568 A | 1/1996 | Venable et al. .............. | 395/155 |
| 5,528,387 A | 6/1996 | Kelly et al. .................. | 358/488 |
| 5,611,033 A * | 3/1997 | Pittcloud et al. ............ | 395/135 |
| 5,685,002 A * | 11/1997 | Sano ............................ | 395/117 |
| 5,731,814 A * | 3/1998 | Bala ............................. | 345/356 |
| 5,732,230 A * | 3/1998 | Cullen et al. ................ | 395/339 |
| 5,845,018 A * | 12/1998 | Breish ......................... | 382/164 |
| 5,848,185 A * | 12/1998 | Koga et al. .................. | 382/164 |
| 5,864,411 A * | 1/1999 | Norris ......................... | 358/527 |

FOREIGN PATENT DOCUMENTS

| | | |
|---|---|---|
| EP | 0 431 962 A2 | 6/1991 |
| EP | 0 478 334 A2 | 4/1992 |

OTHER PUBLICATIONS

1995 Proceedings vol. 1; Technical Association of the Graphics Arts, 1995.*
Graphics Gems I, A. Glassner, Ed. Academic Press, "A Deed Fill Algorithm", pp. 275–277, 1990.
Klauss Voss and Herbert Suesse;". . . Fitting of Planar Objects by Primitives"; 1015–4651/96; 1996 IEEE Proceedings of ICPR '96; pp. 508–512.
Radmilo M. Bozinovic and Sargur N. Srihari; "Off–Line Cursive Script Word Recognition"; IEEE Transactions on Pattern Analysis and Machine Intelligence, vol. 11, No. 1, Jan. 1989 pp. 68–83.
1995 Proceedings, vol. 1; *Technical Association of the Graphic Arts*; "Managing and Representing Image Workflow in Prepress Applications"; Dennis L. Venable, Rob Buckley, and Toshiya Yamada; pp. 373–385.

* cited by examiner

*Primary Examiner*—Mark Wallerson

(57) ABSTRACT

The present invention is an intelligent scanning system for processing a digital input image to automatically characterize a plurality of objects therein. The system then employs the characterizations as the basis for rudimentary image editing operations so as to produce a digital document. In the digital document, the objects may be derotated, shifted, cropped or otherwise aligned in a predetermined fashion in accordance with a template. The scanning apparatus of the present invention not only enables the scanning of a plurality of objects, but does so in an intelligent manner so as to enable further processing and manipulation of the images associated with the objects to create an output document.

17 Claims, 12 Drawing Sheets

```
#   Structured Image ver1.0
sid : smp = {
  aspect_ratio = 1.0 ;
  representation = {
    format = ipd ;
    data = [
      merge = {
        xy = 0.000000 0.132377 ;
        path = {
          object = {                              #first detected object
            size = 0.500000 0.735247 ;
            sid : image1 = {
              aspect_ratio = 1.470494 ;
              representation = {
                format = raster ;
                data = "smp.int" ;        # scanned image
                attribute = {
                  selection = $sel1 ;     # object rectangle
                  derotate = 14.445258 ;  # derotation angle
                } ;
              } ;
            } ;
          } ;
        } ;
      } ;
      merge = {
        xy = 0.500000 0.180773 ;
        path = {
          object = {                              #second detected object
            size = 0.500000 0.638454 ;
            sid : image0 = {
              aspect_ratio = 1.276908 ;
              representation = {
                format = raster ;
                data = "smp.int" ;        # scanned image
                attribute = {
                  selection = $sel0 ;     # object rectangle
                  derotate = 12.238364 ;  # derotation angle
                } ;
              } ;
            } ;
          } ;
        } ;
      } ;
    ] ;
  } ;
} ;

selection : sel1 = Selection: In         # rectangle of second object
rect: Include
0.858490 0.958967
```

FIG. 9

LOCATING THE POSITION AND ORIENTATION OF MULTIPLE OBJECTS WITH A SMART PLATEN

CROSS REFERENCE

The following related applications are hereby incorporated by reference for their teachings:

"METHOD AND APPARATUS FOR IDENTIFYING A PLURALITY OF SUB-IMAGES IN AN INPUT IMAGE," Dennis L. Venable et al., application Ser. No. 08/786,588;

"STRUCTURED IMAGE (SI) EDITOR AND METHOD FOR EDITING STRUCTURED IMAGES," Michael R. Campanelli et al., application Ser. No. 08/338,856, filed Nov. 14, 1994; and "AUTOMATIC IMAGE REGISTRATION USING BINARY MOMENTS," Ricardo L. de Queiroz et al., application Ser. No. 08/787,502.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

To improve the efficiency of scanning systems and digital copiers, it is desirable to produce a single scanned image composed of several separate objects (e.g., photographs) laid side by side, but preferably not touching, on the platen of the input scanner. To facilitate automated editing of the objects, it is necessary to identify the position, shape and rotation angle of each object. Such a capability can enhance productivity by decreasing the time required for scanning multiple objects and by automating rudimentary editing operations.

The present invention is directed to a system intended to accomplish the automatic determination of independent regions or segments for objects within a scanned image. The invention further provides a user interface and document templates to facilitate the automatic placement of the plurality of objects at positions within a digital document so that the document may be rendered, stored or transmitted. Thus, the present invention combines a number of graphics and image processing techniques into an automated, user-friendly application for productivity enhancement. The application can enhance productivity by decreasing the time required for scanning multiple images, by automating corrections for alignment of multiple images, and even automatically placing multiple images in the document template.

The present invention accomplishes these objectives by:

1) locating a plurality of independent objects within the image
2) modeling the shape of the identified objects (e.g., rectangle)
3) creating a structured image description identifying the location, shape and orientation of each object within the image.

Heretofore, a number of patents and publications have disclosed image segmentation and structured images, the relevant portions of which may be briefly summarized as follows:

U.S. Pat. No. 5,485,568 to Venable et al., issued Jan. 16, 1996, and hereby incorporated by reference, discloses a method and apparatus for representing a complex color raster image as a collection of objects in a structured image format—a hierarchical, device-independent format. A structured image document, generated using the techniques described by Venable, is a representation of data that may be rendered into a raster image. The data includes simple raster images as well as a hierarchical collection of sub-objects and raster processing operations. The possible data types for objects in the structured image include a raster image, text, graphics, image processing description, and files containing multiple image representations In "MANAGING AND REPRESENTING IMAGE WORKFLOW IN PREPRESS APPLICATIONS", *Technical Association of the Graphic Arts* (*TAGA*) Vol. 1, 1995 Proceedings pp. 373–385, hereby incorporated by reference for its teachings, Venable et al. teach the use of structured images to manage prepress workflow. An operation such as gang scanning is described as a means for capturing several photographs roughly aligned on a scanner platen.

In accordance with the present invention, there is provided an imaging apparatus, including:

an image input device, said image input device producing a digitized image including representations of each of a plurality of objects imaged by said device;

a programmable computer capable of processing the digitized image, said computer including a first memory for storing at least a portion of the digitized image and program memory for the storage of executable code suitable for causing said computer to execute image processing operations on the digitized image, said computer, in accordance with preprogrammed instructions, identifying the plurality of objects within the digitized input image, modeling shapes representing boundaries of each of the plurality of objects, and characterizing each of the plurality of objects by parameters including shape, position and orientation; and said computer automatically composing an output document including a representation of at least one of the plurality of objects.

In accordance with another aspect of the present invention, there is provided A digital copying apparatus, including:

an image input device having a transparent platen, said image input device producing a digitized image including representations of each of a plurality of objects placed on the platen;

a programmable computer capable of controlling the operation of the digital copying apparatus and of processing the digitized image, said computer including a first memory for storing at least a portion of the digitized image and program memory for the storage of executable code suitable for causing said computer to execute image processing operations on the digitized image, said computer, in accordance with preprogrammed instructions, identifying the plurality of objects within the digitized input image, modeling shapes representing boundaries of each of the plurality of objects, and characterizing each of the plurality of objects by parameters including shape, position and orientation, and said computer automatically composing an output document including a representation of at least one of the plurality of objects;

a user interface, said user interface comprising a display to depict the output document and a plurality of user selectable option, wherein said computer further includes preprogrammed instructions to update the display in accordance with a selection of the user selectable options; and a printing engine to produce, in accordance with the output document, a substrate bearing marks in accordance with representations contained in the output document.

One aspect of the invention deals with a basic problem in digital image processing, that of identifying plural objects within a digitized image. The solution to this problem is then leveraged so as to enable the automated recognition and placement of objects to compose a digital document. The techniques described herein enable a user to expediently scan a plurality of distinct documents or objects in a single scanning operation, automatically separate those objects by recognizing them as independent objects within the digitized image, and recomposing a digital document using one or more of the recognized objects. Another aspect of the present invention allows for the automatic creation of a structured image representation of the digitized image so that the image objects may be easily extracted and further processed, independently.

The techniques described above are advantageous because they improve the efficiency of a scanning process, allowing multiple original documents to be scanned at one time, as well as the document composition process by recomposing the documents into a single document using a predetermined template. In addition, the techniques allow for automatically characterizing physical attributes (e.g., location, shape and orientation) of the objects without user intervention.

BRIEF DESCRIPTION OF THE DRAWINGS

FIG. 9 is an illustration of the output of the system of FIG. 1 when an input image is processed in accordance with the present invention;

Figure 1:
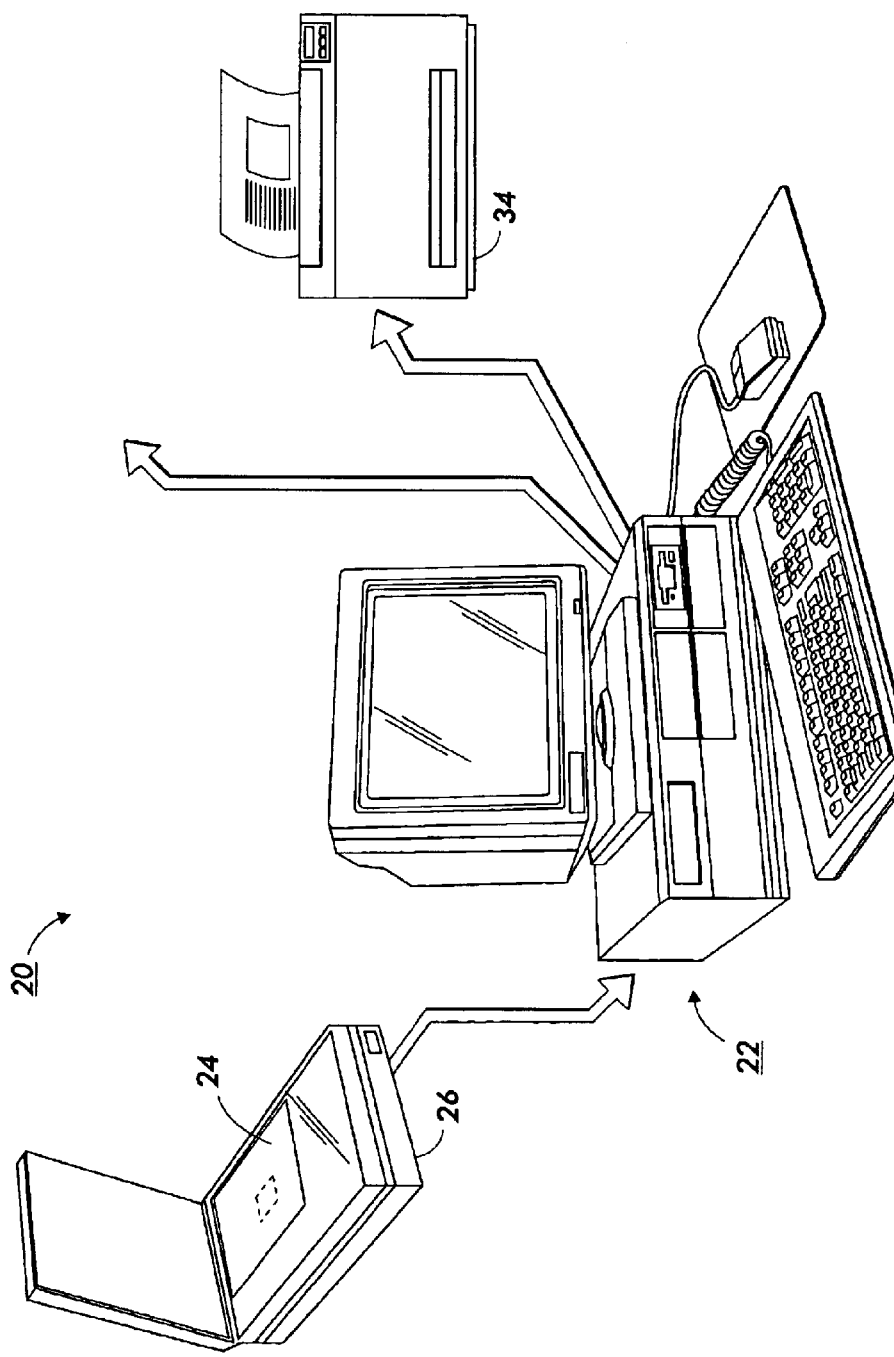
FIG. 1 is an illustration of the equipment that forms an image processing system serving as one embodiment for the present invention.

The present invention will be described in connection with a preferred embodiment, however, it will be understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of 2N values. A "multi-bit" item of data is an item of data that includes more than one bit.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A signal "indicates" or "selects" one of a set of alternatives if the signal causes the indicated one of the set of alternatives to occur. For example, a signal can indicate one bit set in a sequence of bit sets to be used in an operation, in which case the signal causes the indicated bit set to be used in the operation.

An "image" is a pattern of physical light. An image may include characters, words, and text as well as other features such as graphics. A text may be included in a set of one or more images, such as in images of the pages of a document. An image may be processed so as to identify specific "objects" within the image, each of which is itself an image. A object may be of any size and shape and has "physical attributes" or characteristics including, but not limited, to position, shape and orientation.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation performs "image processing" when it operates on an item of data that relates to part of an image.

Pixels are "neighbors" or "neighboring" within an image when there are no other pixels between them and they meet an appropriate criterion for neighboring. If the pixels are rectangular and appear in rows and columns within a two-dimensional image, each pixel may have 4 or 8 neighboring pixels, depending on the criterion used.

An "edge" occurs in an image when two neighboring pixels have sufficiently different pixel values according to an appropriate criterion for the occurrence of an edge between them. The terms "edge pixel" or "boundary pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

A "version" of a first image is a second image produced using an item of data defining the first image. The second image may be identical to the first image, or it may be modified by loss of resolution, by changing the data defining the first image, or by other processes that modify pixel values of the first image.

An "image input device" is a device that can receive an image and provide an item of data defining a version of the image. A "scanner" is an image input device that receives an image by a scanning operation, such as by scanning a document. A scanner may have a transparent surface (platen) or equivalent means to support a document during scanning. Other well-known image input devices include digital cameras, facsimile machines, and video recorders having the capability to store data signals representative of the intensity of light reflected from the surface of objects at which the device is directed.

An "image output device" is a device that can receive an item of data defining an image and provide or render the image as output. A "display" is an image output device that provides the output image in human viewable form, and a "printer" is an image output device that renders the output image in a human viewable, hard copy form.

Figure 2:
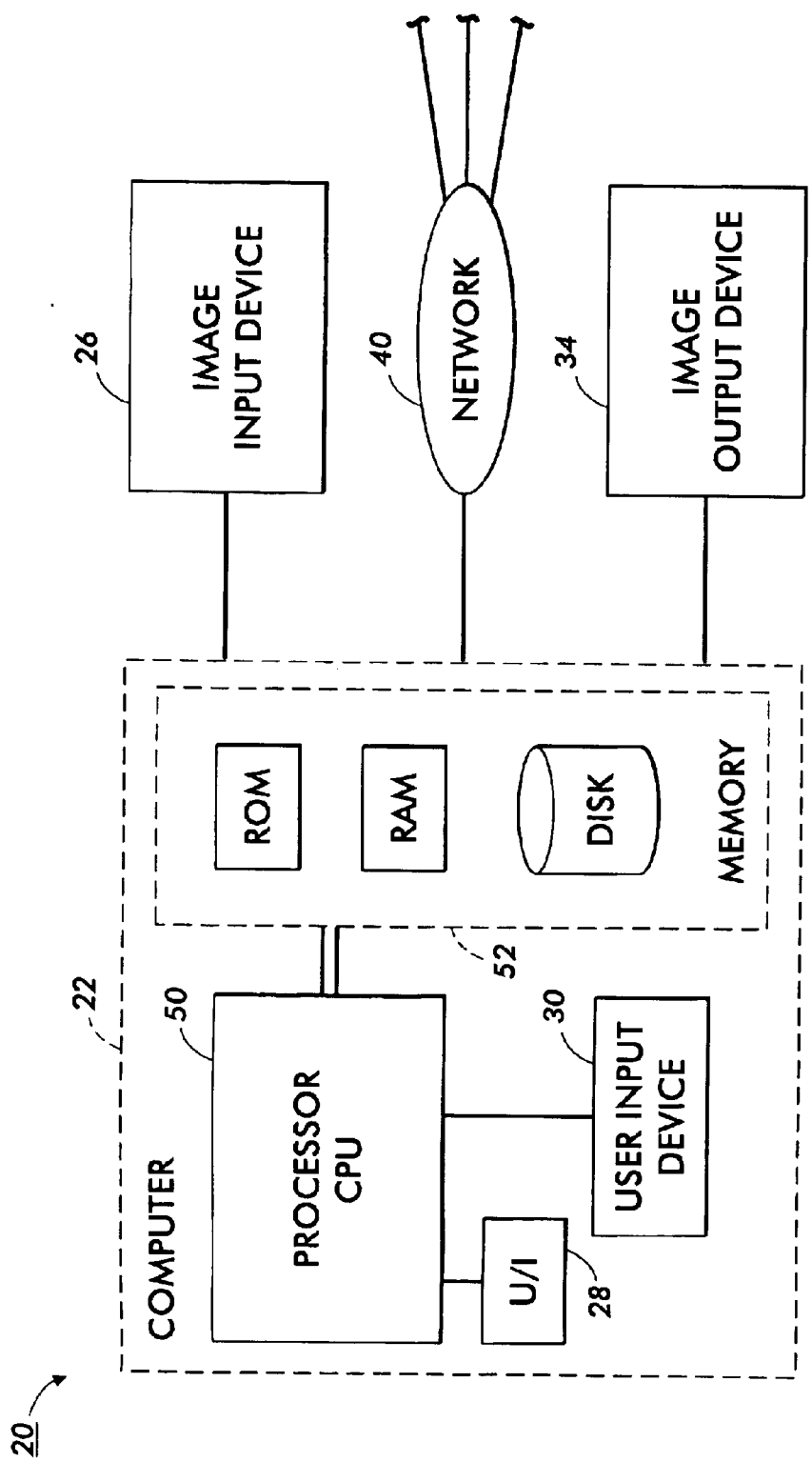
FIG. 2 is a block diagram of the various components comprising the system of FIG. 1.

Referring now to FIGS. 1 and 2, depicted therein is a smart platen system 20 in which the present invention finds particular use. System 20 includes a computer 22 capable of receiving digital data representing an image of an original document 24 placed upon a platen of scanner 26. Computer 22, initially stores the digital input data from scanner 26 in memory 52 (e.g., RAM or magnetic disk storage) where the image may subsequently be accessed. In addition to the digital data, memory 52 may also include program memory for the storage of object code suitable for directing the processor to execute image processing operations in accordance with the invention described herein. Computer 22 has associated therewith a user interface (U/I) 28 including one or more user input devices 30, such as a keyboard, a keypad, a mouse, trackball, stylus or equivalent pointing device, etc.

Also part of system 20 is an image output device such as printer 34 which may include a laser-driven, xerographic printing engine as found in a number of commercially available printers. In a preferred embodiment, system 20 is employed to process the digital image data received as input from a scanner 26, utilizing image processing software running in processor 50, so as to produce an output file that may be rendered by printer 34, stored in memory 50, and/or transmitted to another device via network 40.

Although system 20 is depicted as a plurality of interconnected units, it will be appreciated that the system may also comprise what is commonly referred to as a "digital copier." In such an embodiment, the components of system 20 are integrated within a common housing, and the user interface (including display and input devices) may have a significantly different appearance. An example of such a color digital copying system in which the present invention may find particular use is the Xerox 5775 Digital Color Copier, controlled via a touch-screen color video monitor that shows the progression of operations. It will be appreciated that the document placed upon the scanner platen in system 20 preferably includes a plurality of photographs or other objects represented by marks on a substrate surface, so that such objects may be scanned by a single scanning operation. For example, a particular embodiment to which the following description will be directed is a single scanned image representative of several separate photographs laid side by side on the platen of scanner 26, but not touching or overlapping. In accordance with the present invention it is desired to automatically identify the position, shape and rotation angle of each original photograph.

Figure 3:
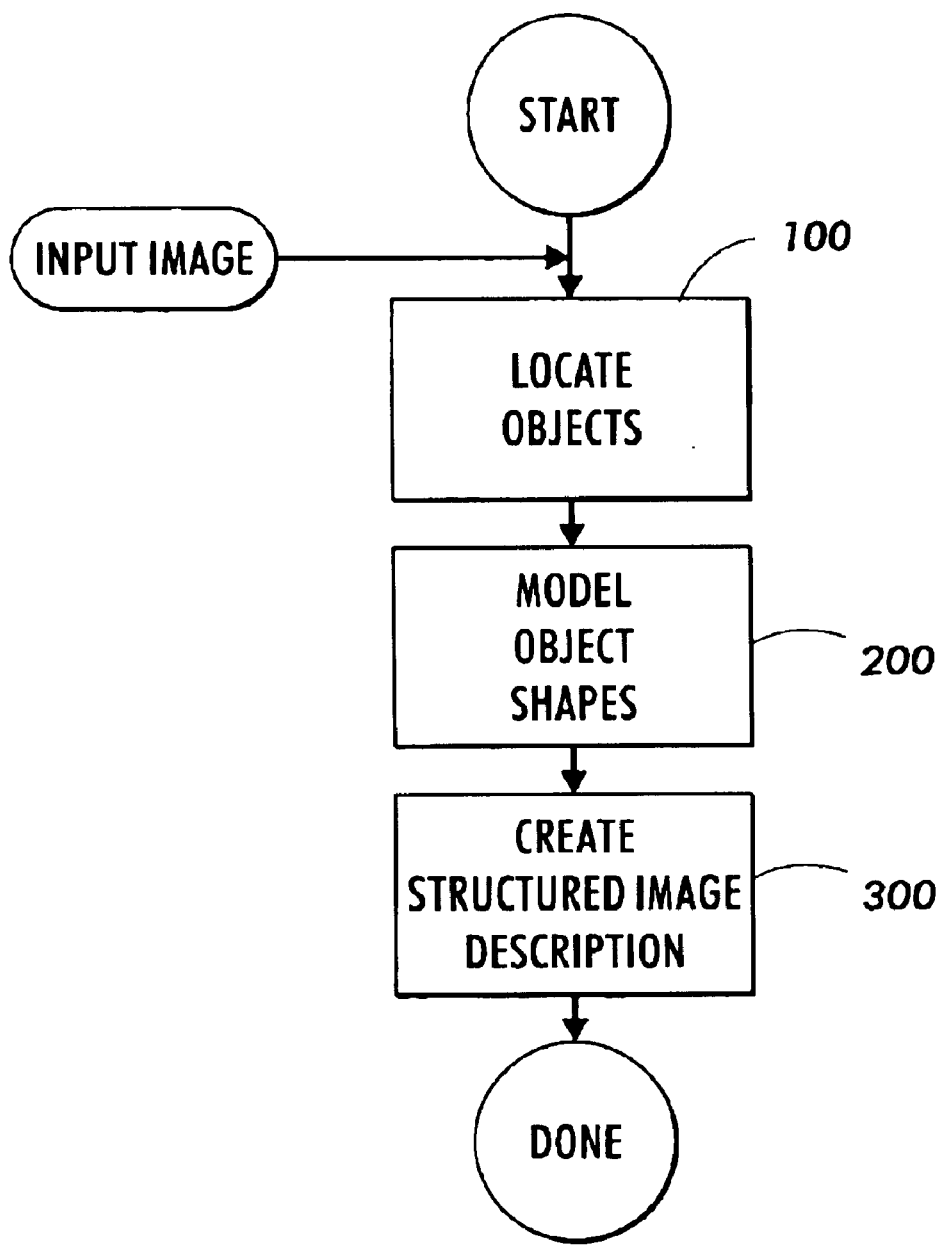
FIG. 3 is a flowchart illustrating the general processing steps carried out on the system of FIGS. 1 and 2 in accordance with the present invention.

Given an input image generated by scanning several separate photographs laid side by side on the scanner platen, the present invention automatically identifies at least the position, shape and orientation angle of each photograph. As shown in the flow chart of FIG. 3, the process carried out by computer 22 during the processing of the input image includes three general steps. First, at step 100 the objects within the image are located and boundaries of the object are generally identified. Once the objects are located, the shape of the objects is modeled at step 200. Having located the objects and modeled their shape, a structured image representing the image and objects therein can be created as represented by step 300. The structured image preferably includes data representing not only the image data itself, but data representing the location, shape or orientation of each object, or some combination thereof. Alternatively, the output may be a page description language format or equivalents formats suitable for storing the image information in a retrievable form.

In a preferred embodiment of the present invention, the scanned input image (or a lower resolution version thereof) is loaded into a memory frame buffer (RAM) where it is analyzed in accordance with the previously described steps. For purposes of the following detailed description, it is assumed that objects do not occlude one another and that the background of the image is contiguous. These simplifying assumptions are intended for purposes of explanation only and are not intended as limitations of the invention. One skilled in the art will appreciate that the invention described herein is extensible so as not to require operation only within the boundaries of such assumptions.

Figure 4:
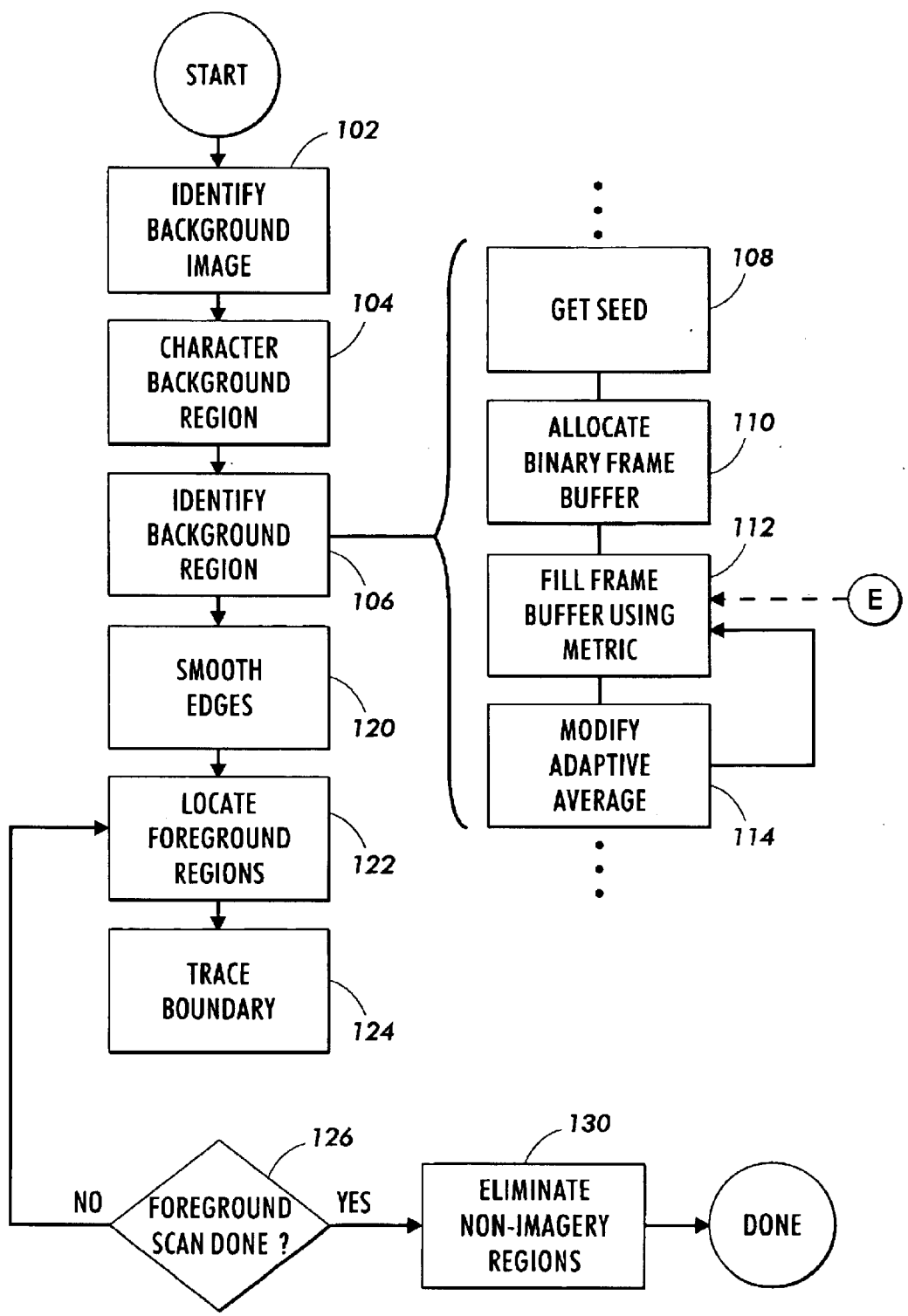
FIGS. 4–7 are detailed flow charts illustrating the processing steps carried out in accordance with various embodiments of the present invention.

As depicted by the flow chart of FIG. 4, the object location step 100 is performed by first identifying the background region of the input image 102, characterizing the background region 104, and then using the characteristic of the background region as a seed, identifying all the pixels representing the background region with an adaptive seed fill algorithm 106. Background pixels are pixels not associated with any objects, or more simply, they are pixels representative of those regions lying outside of the objects, the values of which are controlled by the "background" against which the objects are placed during scanning (e.g., the underside of the platen cover). One embodiment employs the average color of a small region in the upper left-hand corner of the scanned image as an initial estimate of the background color. Alternatively, other sampling operations may be employed to determine the background color as described, for example, in U.S. Pat. No. 5,282,091 for a Programmable Apparatus for Determining Document Background Level by Farrell.

Once the background color is characterized at step 104, an adaptive algorithm is preferably applied to monitor the background color and to accurately identify the objects. An example of a seed fill algorithm suitable for use in the present invention is described in *Graphics Gems I,* A.

Glassner Ed., Academic Press, pp. 275–277, 1990, hereby incorporated by reference. An adaptive algorithm is required because the background pixels may have significant color variation resulting from a variation in illumination over the platen area. The adaptive seed fill algorithm is applied to the scanned color image data using an initial seed point characterized by the background, for example, the upper-left corner of the image. Generally, the adaptive seed fill algorithm fills a binary frame buffer with a mask indicating all contiguous pixels identified as background pixels. In a simple embodiment, represented by step 112, a pixel is considered to be a background pixel if its color falls within a small distance $\epsilon$ of the current average background pixel value. This distance is calculated as an Euclidean metric in red, green, blue (RGB) color space $$d = SQRT((P_r - AdAvg_r)^2 + (P_g - AdAvg_g)^2 + (P_b - AdAvg_b)^2),$$

where $P_k$, $AdAvg_k$ are, respectively, the RGB components of the pixel under test and the average background value, and d is the distance measurement. The value of $\epsilon$ is fixed and empirically determined in one embodiment. The test conducted at step 112 is:

if $d<\epsilon$, then pixel $P$ is a background pixel, else pixel $P$ is a foreground pixel.

The average background color is adaptively modified at step 114 by taking the average value of the last N pixels that have been classified as background. For efficiency, the system preferably calculates the adaptive average using the equation:

$$AdAvg' = (N*AdAvg - AdAvg + LastVal)/N,$$

where AdAvg' is the modified average, AdAvg is the previous adaptive average, LastVal is the value of the last pixel identified as background, and N is the averaging window. Clearly, this is not a true running average, but it tracks the running average adequately and is more computationally efficient than a strict running average calculation. Alternatively, the value of $\epsilon$ can be adaptively modified. For example, $\epsilon$ might be based on the standard deviation of the last several pixels identified as background, etc.

It will be appreciated that alternative methods for the detection of background regions may be employed, and that the process of obtaining a binary map distinguishing the objects from the background may be accomplished using a simplified thresholding operation based upon the background color. In a preferred embodiment, the background color may be a function of the color of the platen cover, such as a white cover. As a further example, the 5775 Digital Color Copier employs a spectrally reflective platen cover that results in a bluish background color that may be detected and distinguished from the objects.

Having identified all background pixels and created a binary mask representative of the background regions, the process at step 120 is executed to smooth noisy edges in the background mask using morphological filtering. More specifically, a morphological closure filter is preferably applied to the background mask to eliminate single pixel noise and to smooth object edges. Subsequently, contiguous foreground regions are located, step 122, thereby identifying the objects. Objects are identified by scanning the background mask generated by the adaptive seed fill operation (step 106). Starting with the upper left hand pixel, the mask is searched in a scan line fashion for a pixel not classified in the mask as a background pixel—thus identifying pixels associated with a foreground object. The use of the seed fill algorithm for identifying the background assures that foreground objects are closed, or in other words, complete boundary is formed about the perimeter of the object.

At step 124, the boundary of an object is identified by tracing its edge. The boundary of the foreground object is traced using a simple 8-connected edge traversal which provides an ordered-set of points tracing the edge of the object. Such an edge traversal operation employs a contour tracing operation to generate a chain code in a manner similar to word or character based recognition systems. An 8-connected process is described, for example, by R. Bozinovic et al. in "Off-Line Cursive Script Word Recognition", *IEEE Transactions on Pattern Analysis and Machine Intelligence,* Vol. 11, No. 1 (January 1989). Once the edge is traced, all pixels associated with the object in the mask are marked as background so they will not be processed a second time, the object is added to the foreground object list and then the scanning of step 122 is continued as indicated by test step 126. Subsequent to completing the foreground scanning to identify all objects, a review of the identified objects may be completed as represented by step 130. In many cases, the scanned image may contain undesirable foreground objects; such objects can be eliminated from the object list at this step. In one embodiment, the review of the object list may simply eliminate small objects as unlikely images. For example, in a scan of a yearbook page each image has associated with it a text caption that is not to be classified as image data. Such captions consist of many, small perimeter objects, so that by measuring the perimeter length of the traced edges, it is possible to eliminate objects having a perimeter smaller than a specified length, where the threshold length may be predetermined empirically.

Once the objects have been located, as described with respect to step 100, the next general step, step 200, is to model the shape of the object. For purposes of simplicity, the following description will treat rectangular-shaped objects, however, it will be appreciated that the description is extensible to other polygons and even to shapes having portions thereof represented by curves (e.g., circular or elliptical objects). The result or output from step 100 is preferably a set of edge traces, in the form of linked lists, that identify bounding pixels about each object within the scanned image. These traces can be used to extract each object, but orientation is not yet determined. To improve the quality of the object extraction, the object traces are fitted to a model shape. Orientation information, etc., may then be extracted from the fitted parameters. In the described embodiment the object traces are fit to a rectangular model, however, other shapes are possible.

One method of fitting the edge traces to a rectangular shape is a least-squares approach to fit to a rectangle. To accomplish the least-squares fitting, the edge trace is first decomposed into four sets of points, each corresponding to one of the four sides of the rectangular object. The decomposition into four sets of points can be accomplished in several ways as described below.

Figure 5:
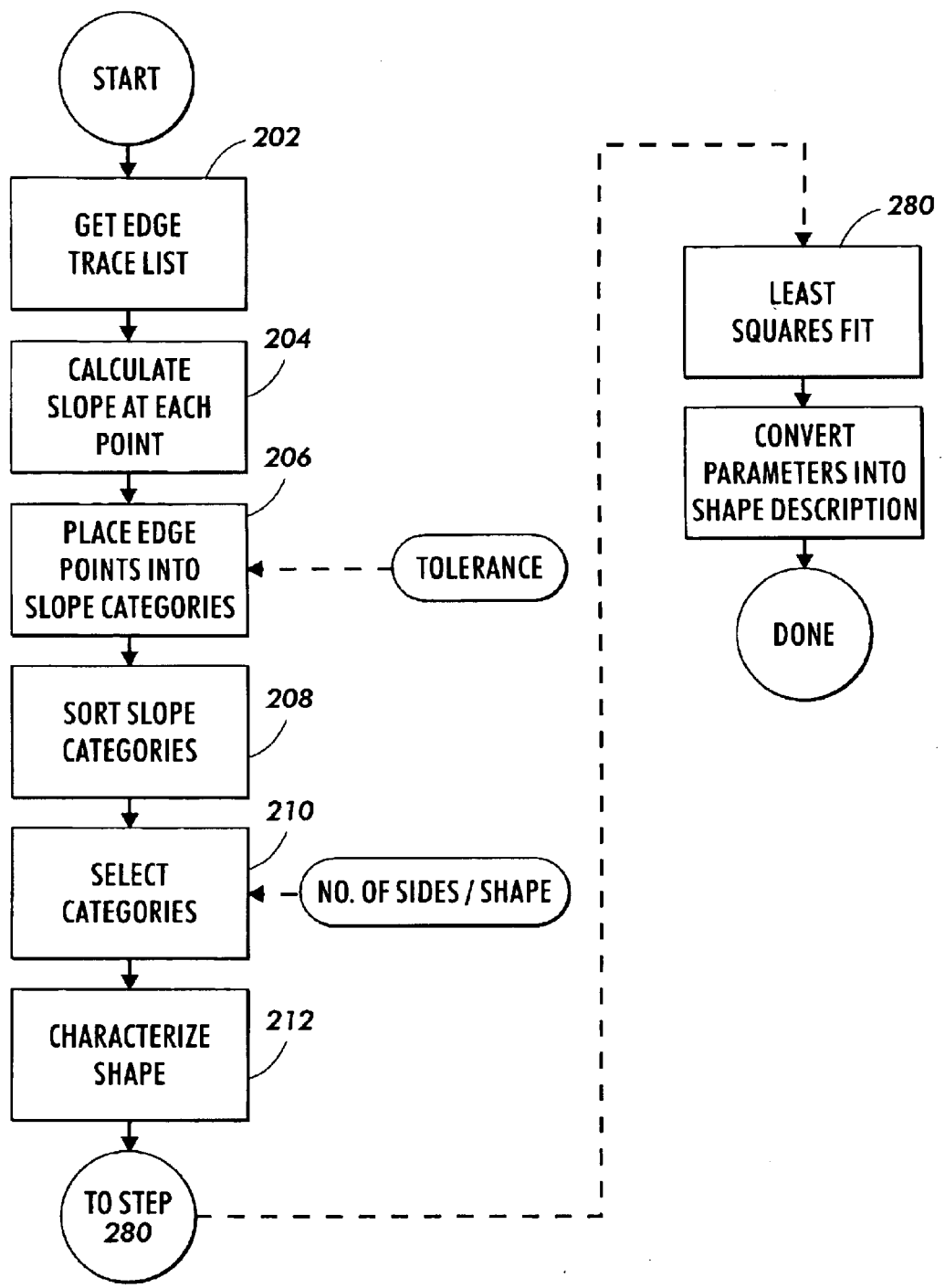

The first method has two principal parts, (a) categorizing the edge points into a set of bins associated with a single line, and (b) performing recognition on the bins for rotated shapes. Referring now to FIG. 5, where the first decomposition method is depicted in detail, step 204 calculates the slope at each point along the edge trace. Step 204 preferably accomplishes the slope angle calculation by performing a linear regression on a small window of neighboring edge points. For example, 2 points lying on either side of the edge point for which the slope is being determined. The angle of the line passing through the center of each point is determined using linear regression in a small window centered on each point. Each regression requires 4 additions per point in the window, plus 2 subtractions, 2 multiplications, and an arctangent calculation, however, the regression algorithm may be further optimized to remove most of the addition operations. In a preferred embodiment, which reduces the computational complexity, a sample of the edge pixels are employed for slope angle calculations and sorting, thereby reducing the number of calculations necessary to categorize the edge pixels.

Figure 8:
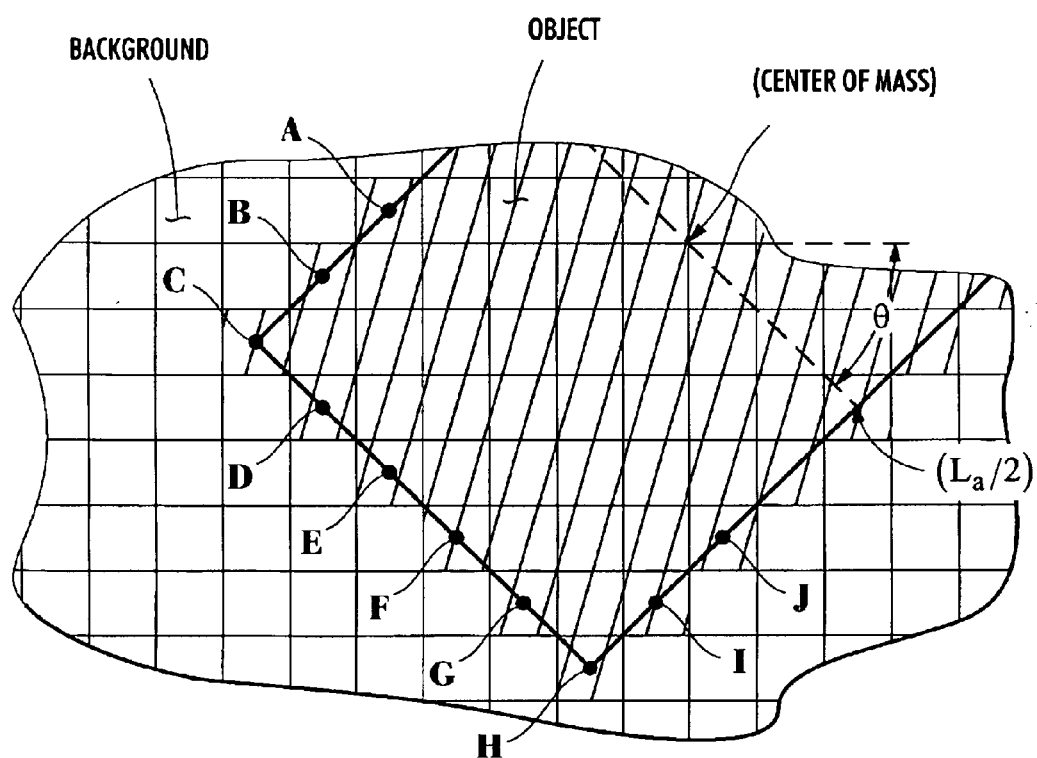
FIG. 8 is an illustrative example of a portion of a digital document.

Next, at step 206, the process constructs a list of slope categories or bins. The slope categories are constructed for each edge point by calculating the magnitude of the difference in the slope angle between the current point along the edge (e.g., point B in FIG. 8) and the preceding point (e.g., point A in FIG. 8). If the difference is less than the value TOLERANCE (determined empirically to be ±5 degrees in one embodiment), then the point is assigned to the same slope category as the preceding point, otherwise a new slope category is created and the point is assigned to it. Referring to FIG. 8, the above-described process would assign points A, B and C to a first slope category, points D, E, F, G and H to a second slope category and points I, J . . . to yet another slope category. Finally, if the slope category for the last edge point has approximately the same slope angle as the first slope category, then all points within the first and last slope categories are joined together into a single category.

Once the slope categories are established at step 206, and stored in a data structure, they are then sorted at step 208 and ordered according to the number of edge points assigned to each category. For rectangular objects, the top four slope categories, those containing the most edge points, should correspond to points along the four edges of the rectangle. The top slope categories are then selected at step 210. It will be appreciated that one would use the top six categories for hexagonal objects, and similarly the top three categories for triangular objects, etc.

Alternatively, steps 208 and 210 may be replaced by a step that processes the slope angle categories or bins by simple, or even statistical elimination, wherein those categories with few entries are removed. For example, an empirically determined threshold of 5 pixels may be applied so that only bins having more than 5 pixels with a common angle are kept. Subsequently, an average angle for a category may be determined using simple linear regression of all the points assigned to a particular category. With the average angle determined, a further refinement of the categories would be possible, combining those categories having substantially common angles. In particular, each category is checked and if adjacent categories are substantially collinear, the categories are joined. Thus each of the remaining bins or categories represents a set of collinear points lying along an edge. The edge points assigned to each of the remaining slope angle categories represent the edge trace decomposed into the four sides of the rectangle. It will be appreciated that this alternative is broadly directed to the process of "filtering" or refining the categories to identify those representing the actual edge of the objects. Accordingly, equivalent methods of accomplishing the refinement of the categories are contemplated.

This first method of characterizing the object boundaries is computationally intensive due to the measurement of the average slope at each edge point. In the alternative embodiment mentioned previously, to improve speed, the edge trace may be sampled to reduce the total number of points that must be processed and categorized.

It will be further appreciated that it may be possible, from an analysis of the ordered categories, to identify the shape. For example, a statistically significant difference in the number of points between a third and fourth category, or the complete lack of a forth category, are indicative of a triangular-shaped object.

Figure 6:
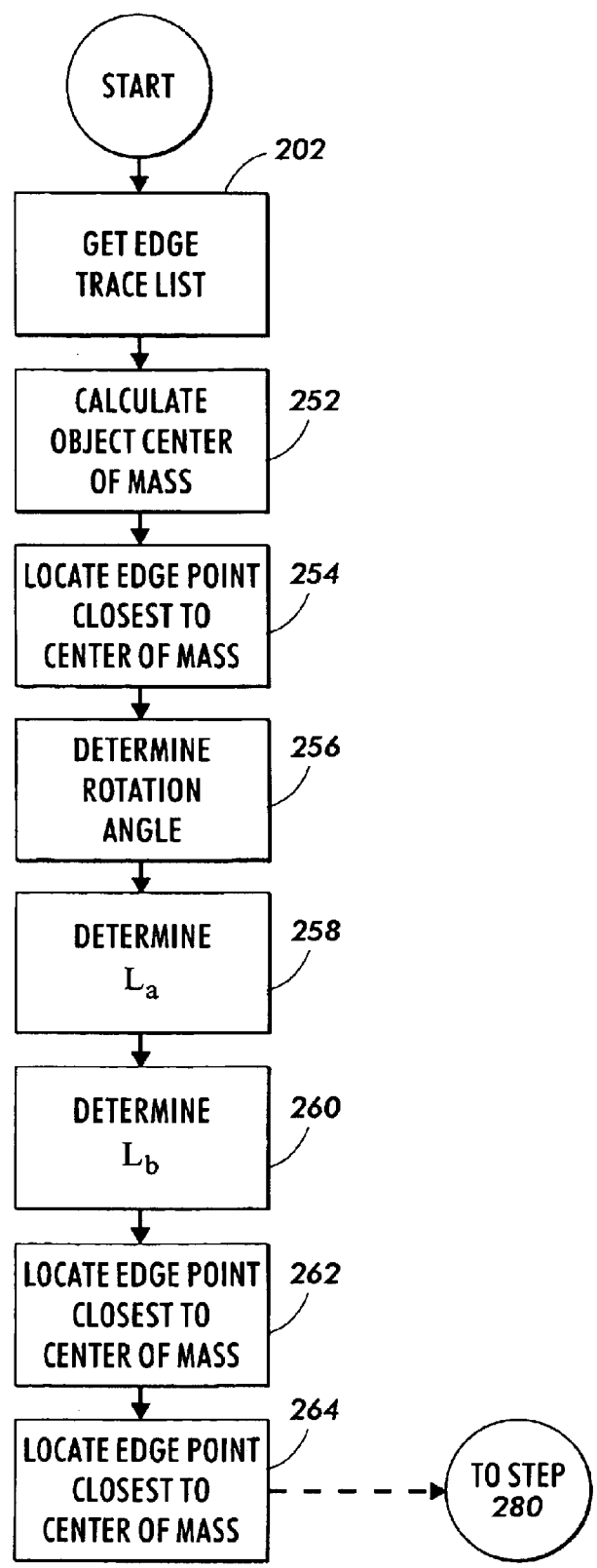

Referring to FIG. 6, depicted therein is the second method by which the object shapes may be modeled. After retrieving the edge trace list data at step 202, step 252 calculates the center of mass of the object. Although there are a number of well-known methods for calculating the center of mass of the object, in the case of rectangular objects a straightforward approach would be averaging the (x,y) coordinates of the edge points. Next, the edge point closest to the center of mass would be located at step 254. The closest point will be the approximate center of the long side of the rectangle. Referring again to FIG. 8, the angle $\theta$ from the center-of-mass (CofM) to the center point ($L_a/2$) is the approximate rotation angle ($\theta$) of the rectangle.

Once the rotation angle is determined, it is employed in step 256 to determine the approximate length of the minor axis of the rectangle at step 258. In particular, the distance from the center-of-mass to the average position of all edge points that lie in the angular range $\theta - \Delta A$ to $\theta + \Delta A$ is determined. This distance is an approximate measure of one-half the minor axis length $L_b$ of the rectangle. $\Delta A$ is an empirically determined value on the order of approximately 5 degrees. Step 260 approximates the length of the major axis ($L_a$) in much the same manner. The distance from the center-of-mass to the average position $(\theta+90)+\Delta A$ is an approximate measure of one-half the length of the major axis $L_a$ of the rectangle. Having approximated the orientation angle and the lengths of the major and minor axes, step 264 calculates an angular range (as measured with respect to the center-of-mass) for each side of the rectangle that encompasses only those edge points associated with that side:

| | | |
|---|---|---|
| a) | $\theta'_b = \text{atan2}(L_a, L_b)$ | half angle width of major axis; |
| | $\theta'_a = 90 - \theta_b$ | half angle width of minor axis; |
| | $\theta_b = \theta'_b * \text{TOL}$ | where TOL = 0.95 to avoid corners; |
| | $\theta_a = \theta'_a * \text{TOL}$ | where TOL = 0.95 to avoid corners; and |
| b) | Range$_1$: | $(\theta + \theta_b)$ to $(\theta - \theta_b)$ |
| | Range$_2$: | $((\theta + 90) + \theta_a)$ to $((\theta + 90) - \theta_a)$ |
| | Range$_3$: | $((\theta + 180) + \theta_b)$ to $((\theta + 180) - \theta_b)$ |
| | Range$_4$: | $((\theta + 270) + \theta_a)$ to $((\theta + 270) - \theta_a)$ |

Once the angular range is determined, step 266 finds all the edge points that lie within each of the four angular ranges (relative to the center-of-mass) determined above, thereby identifying the edge points corresponding to each side of the rectangle. It will be appreciated that this technique is less sensitive to edge-noise than the first method described above.

Once the edge trace has been decomposed into four sets of points, each set corresponding to one of the four sides of the rectangle, a least squares calculation for fitting the points to rectangle is evaluated at step 280. A rectangle can be described as four mutually perpendicular lines defined by the equations:

$$y = \alpha_0 + \beta x,$$

$$y = \alpha_1 + Y x,$$

$$y = \alpha_2 + \beta x,$$

$$y = \alpha_3 + Y x,$$

where $\beta_y = -1$. A least squares fit yields the fitted parameters:

$$\beta_n = \sum \left( \sum_{i=0}^{n_k} x_{ki} y_{ki} - \frac{1}{n_k} \sum_{i=0}^{n_k} x_{ki} \sum_{i=0}^{n_k} y_{ki} q \right)$$

$$\beta_d = \left( \sum_{i=0}^{nl} x_{0i}^2 - \frac{1}{n_0} \left( \sum_{i=0}^{nl} x_{0i} \right)^2 \right) + \left( \sum_{i=0}^{nl} y_{1i}^2 - \frac{1}{n_1} \left( \sum_{l=0}^{Nl} y_{1i} \right)^2 \right) +$$

$$\left( \sum_{i=0}^{nl} x_{2i}^2 - \frac{1}{n_2} \left( \sum_{i=0}^{nl} x_{2i} \right)^2 \right) + \left( \sum_{i=0}^{nl} y_{3i}^2 - \frac{1}{n_3} \left( \sum_{l=0}^{nl} y_{3i} \right)^2 \right)$$

$$\beta = \beta_n / \beta_d$$

$$\alpha_0 = \frac{1}{n_0} \sum_{i=0}^{n_0} y_{0i} - \frac{\beta}{n_0} \sum_{i=0}^{n_0} x_{oi}$$

$$\beta \alpha_1 = \frac{1}{n_1} \sum_{i=0}^{n_1} x_{1i} - \frac{\beta}{n_1} \sum_{i=0}^{n_1} y_{1i}$$

$$\alpha_2 = \frac{1}{n_2} \sum_{i=0}^{n_2} y_{2i} - \frac{\beta}{n_2} \sum_{i=0}^{n_2} x_{2i}$$

$$\beta \alpha_3 = \frac{1}{n_3} \sum_{i=0}^{n_3} x_{3i} - \frac{\beta}{n_3} \sum_{i=0}^{n_3} y_{3i}$$

where $(x_{ki}, y_{ki})$ is the $i^{th}$ edge point of the $k^{th}$ side, and $n_k$ is the number of edge points associated with the $k^{th}$ side. Subsequently, once the least squares fit yields the fitted parameters ($\beta$, $\alpha_0$, $\alpha_1$, $\alpha_2$, $\alpha_3$), they are converted at step 282 the into four coordinate pairs marking the corners of the rectangle. Moreover, the rotation angle of the rectangular object is accurately represented by the slope parameter $\beta$.

Yet another alternative method for fitting the edge traces to a shape is a method employing binary moments for fast image bounding. Using the binary mask generated as described with respect to step 106 (e.g., the adaptive seed algorithm), or alternatively with a simple thresholding operation, the image is rendered in a binary bitmap form where each pixel value is a 0 or 1 indicating background or non-background regions. Once the borders are detected for an object using the binary mask, the alternative embodiment depicted in FIG. 7 employs second-order binary moments to fit a shape (e.g., rectangle) to the object.

Figure 7:
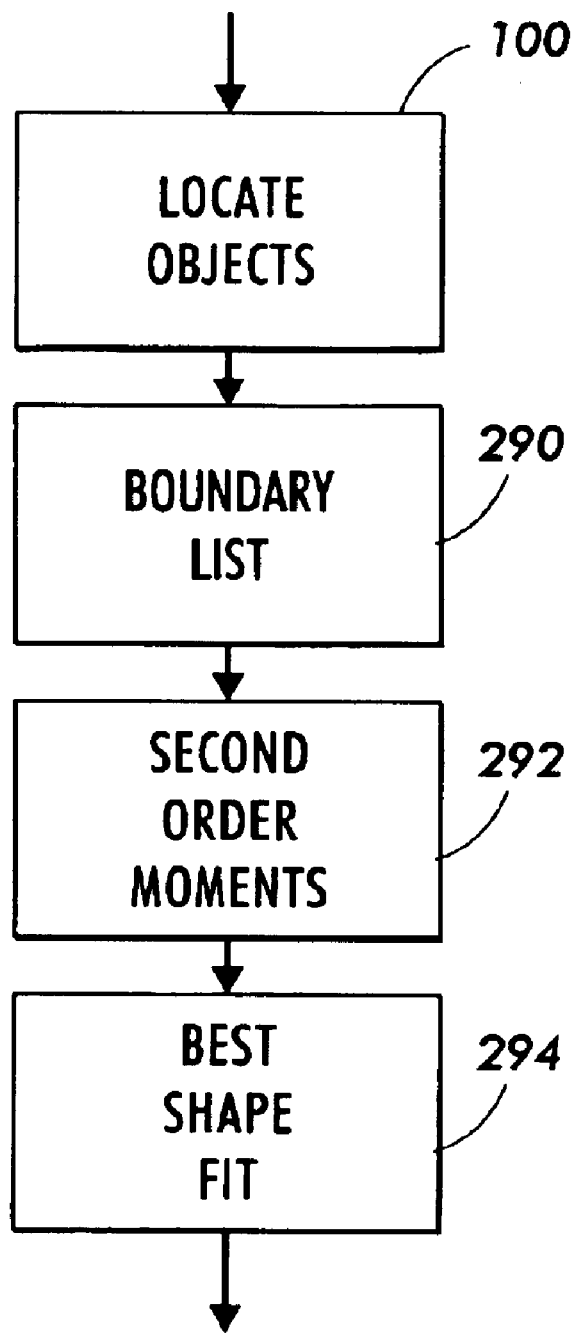

Referring to FIG. 7, depicted therein is a generalized flowchart representing the steps of the binary moment boundary finding technique. Further details of the technique are found in copending application Ser. No. 08/787,502 by Ricardo L. de Queiroz et al., filed concurrently herewith and hereby incorporated by reference for its teachings. At step 100, the object edges are located and recorded as previously described, thereby providing as an input a linked list of boundary or edge pixels referred to as an edge trace, step 290. Using the boundary list, the second order moments are calculated (step 292) in an efficient manner using the equation:

$$\mu_{kl} = \sum_i \sum_j p(i,j) i^k j^l = \sum_i \left( \sum_j p(i,j) j^l \right) i^k = \sum_i p_l(i) i^k$$

where $p(i,j)$ is the image pixel value at image coordinates $(i,j)$ and $p_l(i)$ is the $i^{th}$ order moment of the $i^{th}$ scan line. Because the object boundary pixels are previously determined, the process can be simplified and the right-most and left-most boundary pixels for a particular scanline are used for the 1st order (absolute) moment calculations.

Subsequently, the 2nd order (central) moments ($m_{00}$, $m_{01}$, $m_{10}$, $m_{11}$, $m_{20}$, and $m_{02}$) are calculated using the 1st order moments and the following equations:

$$x_c = -\frac{\mu_{10}}{\mu'_{00}}$$

$$y_c = -\frac{\mu_{01}}{\mu'_{00}} \text{ and}$$

$$m_{pq} = \sum_{r=0}^{p} \sum_{s=0}^{q} \binom{p}{r} \binom{q}{s} x_c^{p-r} y_c^{q-s} \mu_{rs}.$$

Having determined the 2nd order moments, they are employed to characterize an ellipse and from the ellipse the bounding box about the object, step 294. In particular, the center of the ellipse (x, y), the lengths of each axis (a and b) and the rotation angle ($\Theta$) are determined. The bounding box for the rectangular object is determined as a rectangle centered at (x,y) with sides of length $2a$ and $2b$, rotated by an angle $\Theta$. While this renders a bounding box slightly larger than the object, this is done so as to provide a safety margin for the calculation, and to avoid cropping a portion of the object. If a tighter bounding box is desired, the rectangle would be characterized with sides of length $2\alpha a$ and $2\alpha b$, where $\alpha$ is set equal to $\sqrt{3/2}$ or a slightly smaller value to accomplish edge trimming or cropping (e.g., on the order of one or more pixels).

After each object has been modeled as a shape (e.g., rectangle), a structured image is created as described, for example, in U.S. Pat. No. 5,485,568 to Venable et al. The structured image consists of one "child" structured image for each object detected using one of the methods described above. The structured image definition contains attributes that specify which rectangle of the scanned image contains the object data, and also the rotation angle required to correct for any orientation skew. FIG. 9 is an example of a structured image created in accordance with the previously described processes, the structured image containing a pair of rectangular-shaped image objects.

Figure 10:
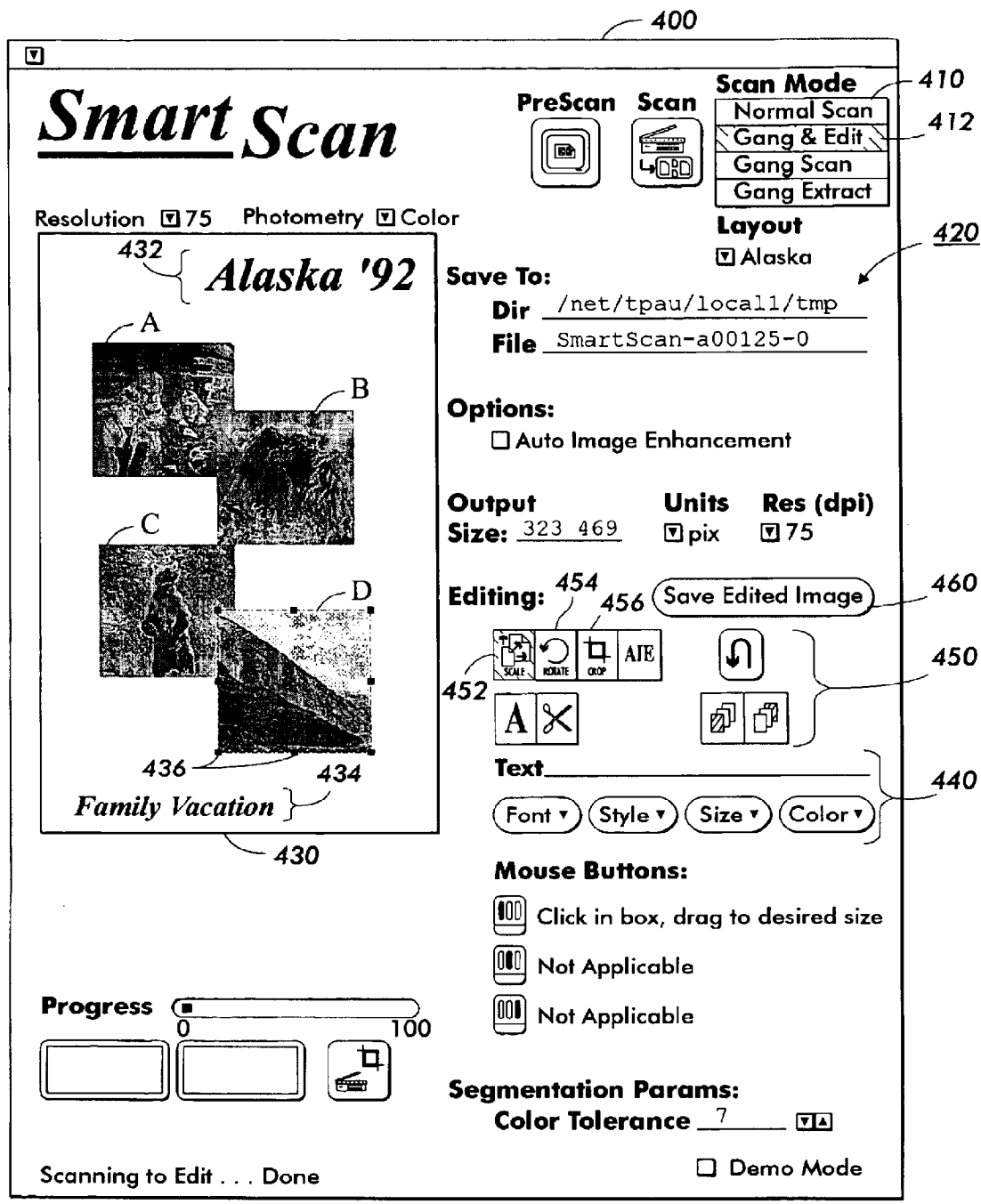
FIG. 10 is an exemplary user interface screen associated with one embodiment of the present invention.

In one embodiment of the present invention, depicted in FIG. 10, the structured image is designed such that when rendered, all objects are de-rotated and laid out in a grid fashion. In particular, FIG. 10 illustrates a user interface 400 that may be employed with various aspects of the previously described object shape recognition method to provide an intelligent or "smart" platen scanning system. The smart scanning system represented by FIG. 10 preferably provides a means by which a user can interface with a digitizing scanner to efficiently obtain digitized representations of objects placed on platen 24 of a scanner.

Figure 11:
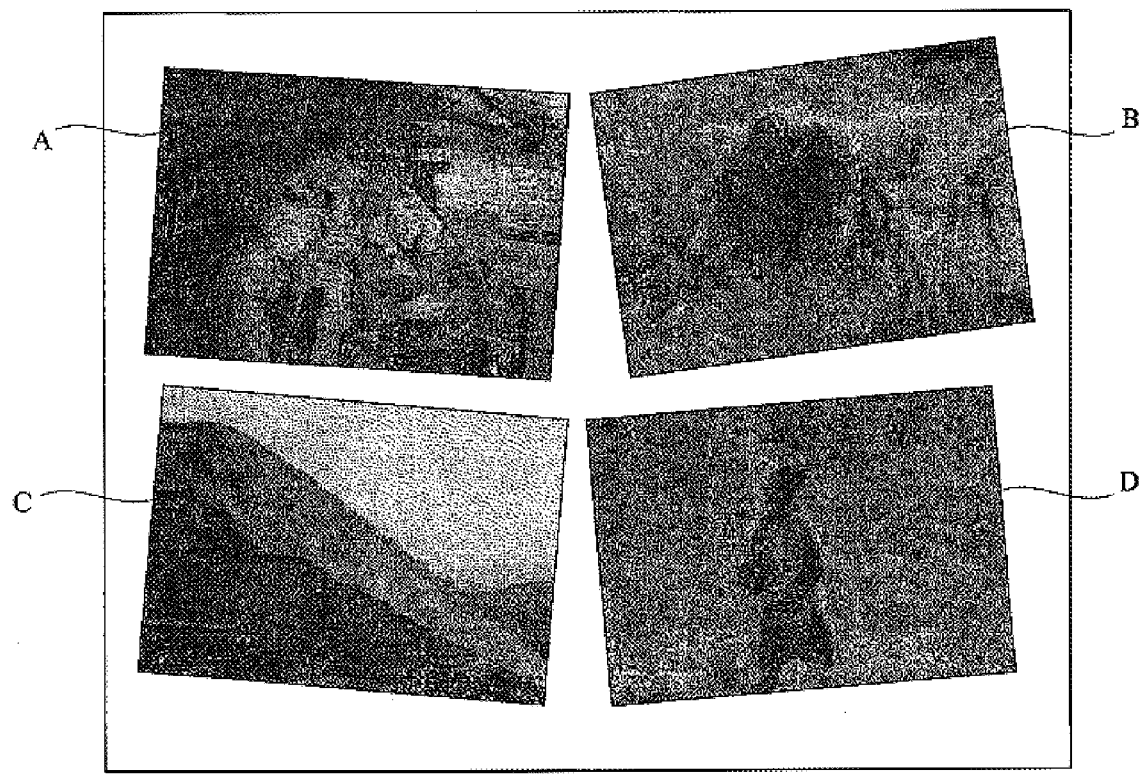
FIG. 11 is an example of an image containing multiple objects obtained by a scanning operation.

For example, referring to FIG. 10 in conjunction with FIG. 1, a user may place a number of photographs on the scanner platen. Once placed thereon, the user may then select an operation from region 410 of FIG. 10 to cause the computer system 22 to initiate scanning by scanner 26. Although not specifically shown, it will be appreciated that various methods for initiating the digitization of the objects may be employed, including, but not limited to, keyboard entry, touch-sensitive screen selection, depression of a remote switch or even triggering of a platen sensor by a user closing the platen cover. As depicted in FIG. 10, after the "Gang & Edit" (412) or equivalent scanning selection is made, system 20 scans the objects placed on platen 24 and temporarily stores the data in the file using the information reflected in region 420 of the user interface screen. For example, the various image objects (A, B, C and D) may be found within an image as illustrated in FIG. 11. Once the image is scanned, it is analyzed as described above to identify the image objects. The image objects may then be manipulated by the smart scanning system to automatically orient and position the images, for example they may be automatically placed in a predefined template and rendered, such as the representation depicted in region 430 of the user interface. It will be appreciated that a user may also be given additional edit capability with respect to the template, for example, to add captions to the objects or to include titles 432 and subtitles 434 as illustrated. Input for such text-based editing would be accomplished via the user interface options depicted in region 440.

Figure 12:
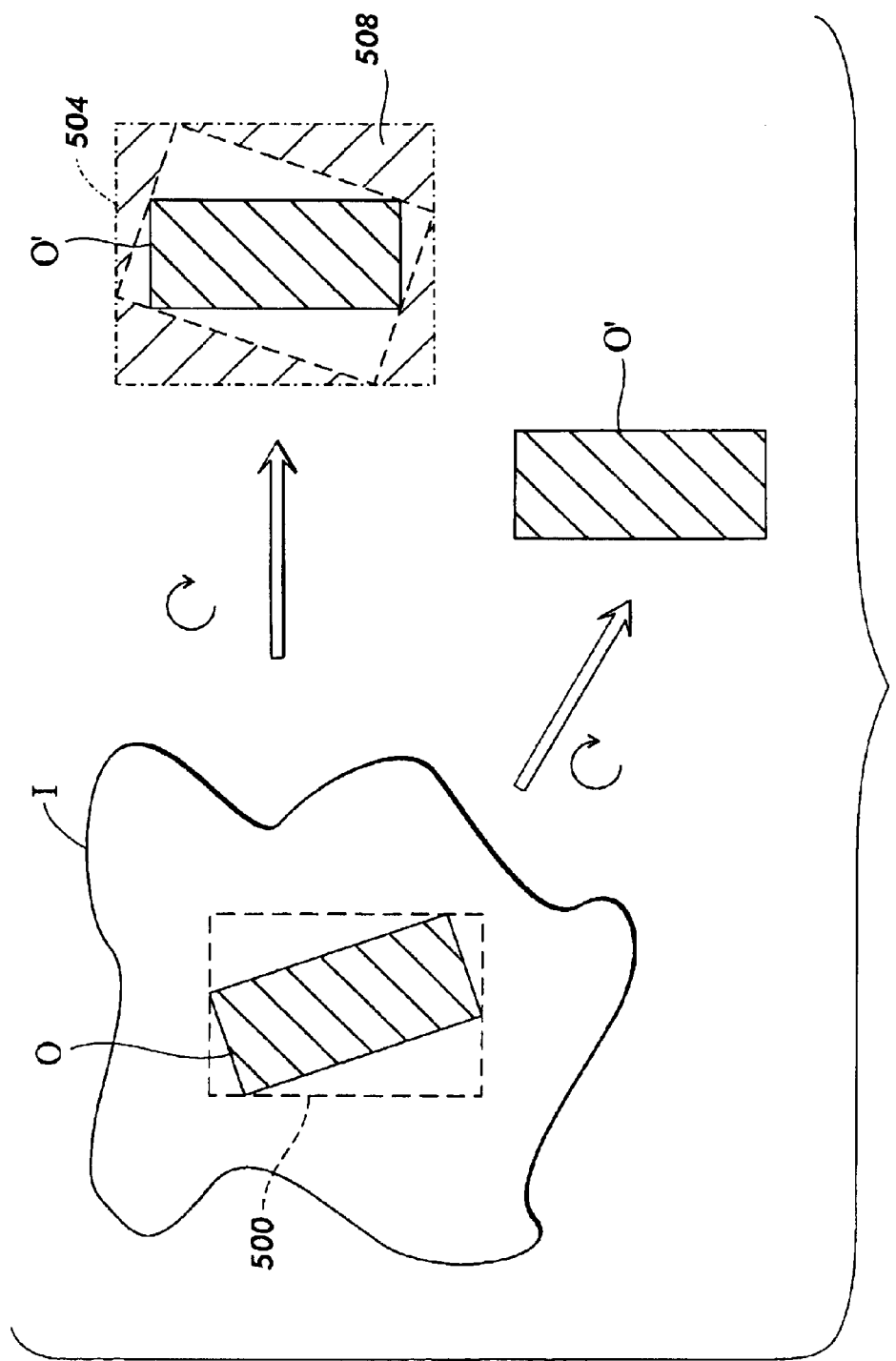
FIG. 12 is a comparative illustration of deskewing and derotation operations as applied to an image segment.

It will be appreciated by those skilled in the art that by defining the boundaries of the objects in an image accurately a derotation operation may be employed to more accurately deskew the object. For further illustration of this advantage reference may be had to FIG. 12. Depicted therein is an object O within an image segment I. In a typical deskewing operation, the orthogonal boundaries of the image are determined as illustrated by bounding box 500 and the image is deskewed to produce the image indicated as 504 including the object O'. It will be appreciated that in order to deskew the image that is not clearly defined by boundaries, the entire image area must be rotated, leading to both a larger deskewed image area and the need to create pixels to fill in regions 508. The present invention, by accurately defining the boundaries and orientation of the object, avoids the need to incorporate regions larger than the object in the derotation operation. Thus, the pixels representing the object itself are the only pixels that are derotated to produce the O' output image.

Also enabled by the smart scanning system would be image editing capabilities as illustrated in region 450 of the user interface. Having identified each of the objects within the image, it is possible to isolate the objects, create separate images therefrom, and to then individually process the images. Thus the individual image objects automatically placed within the template of region 430 may be individually selected, manipulated, scaled (button 452), rotated (button 454) or cropped (button 456). It will be appreciated that the scaling, rotation and cropping operations are in addition to those which are preferably automatically applied by the system as the result of the previously described object recognition methods.

For example, the image scaling button, illustrated with cross-hatching to depict selection, will allow the user to move a cursor (not shown) to select an object (e.g., image object D) and then to drag a side or corner of the object so as to scale the image object. To facilitate the editing of the objects, control points such as those illustrated about the boundary of image object D (436) may be employed in a manner well-known to those who design user interfaces.

As noted, a predefined template may be used to automatically "place" image objects in relative positions on a document or page thereof. It will be appreciated that such templates may be in the form of a structured image definition, so that the template can be used to specify a different layout for the structured image to be generated. Thus, a family seeking to put its photographs in a "digital photo album" may be able to create a template describing a page similar to that shown in region 430 of the user interface. The template would then be used to automatically organize individual images or plural objects within a larger document image.

In a preferred embodiment, the output of the smart scanning system would be a structured image document format as described by Venable et al. in U.S. Pat. No. 5,485,568. An important characteristic of structured images is the ability to store image processing operations in their description. This means that the structured image can contain image processing operations other than simple object deskewing attributes. For example, automatic image enhancement operations may be included within the structured image such that the objects identified can be individually enhanced. Alternatively, the smart scanning system output may take the form of a digital document in one of many well-known page description languages.

Once the "page" composed in window 430 in the condition desired by the user, the user may save the image by selecting the "Save Edited Image" button 460. More importantly, a user may then print or otherwise distribute the composed page(s).

Although the various embodiments of the present invention have been described with respect to the smart scanning system, it will be appreciated that the acquisition of images, and the printing and distribution of the composed pages can be accomplished via networks or on a walk-up digital copier. For example, a user may have photographs automatically scanned by a film processor, and a digitized stamp sheet sent to the user via a network. The stampsheet, being in a structured image format could then be processed using the smart scanning system to produce pages of a digital photo album with one or more objects on each page.

In recapitulation, the present invention is an intelligent scanning apparatus for processing a digital input image to automatically characterize a plurality of objects therein, and to employ the characterization as the basis for rudimentary image editing operations so as to produce a digital document. In the digital document, the objects may be derotated, shifted, cropped or otherwise aligned in a predetermined fashion in accordance with a template. The scanning apparatus of the present invention not only enables the scanning of a plurality of objects, but does so in an intelligent manner so as to enable further processing and manipulation of the images associated with the objects.

It is, therefore, apparent that there has been provided, in accordance with the present invention, an apparatus for the capture and automated processing of images representing a plurality of objects placed on a platen thereof. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An imaging apparatus, including:
an image input device having a platen, said image input device scanning a plurality of undersized originals on the platen and producing a single digitized image including representations of each of the plurality of undersized originals imaged by said device;
a programmable computer capable of processing the digitized image, said computer including a first memory for storing at least a portion of the digitized image and program memory for the storage of executable code suitable for causing said computer to execute image processing operations on the digitized image,
said computer, in accordance with preprogrammed instructions, determining a background of the digitized image, identifying the plurality of digitized undersized originals as objects within the digitized input image based on the determined background, determining boundaries of the plurality of objects, modeling shapes representing the boundaries of each of the identified plurality of objects, and characterizing each of the identified plurality of objects by parameters including shape, position and orientation; and said computer automatically composing an output document including a representation of at least one of the plurality of objects.

2. The apparatus of claim 1, further including a user interface for displaying a representation of the output document incorporating the representation of at least one of the plurality of objects wherein one of the parameters of the at least one object has been altered.

3. The apparatus of claim 2, wherein the position of the representation of the object is shifted to a predefined position in the output document.

4. The apparatus of claim 2, wherein only the representation of the object is derotated so as place a derotated representation of the object in the output document.

5. The apparatus of claim 1, wherein said image input device includes a surface upon which the plurality of objects are placed for digitization.

6. The apparatus of claim 1, wherein the first memory is a frame buffer.

7. The apparatus of claim 1, wherein the first memory is a data storage media accessible by said programmable computer.

8. The apparatus of claim 1, further including template memory for storing at least one template for controlling the position and orientation of the representation of the at least one object during composition of the output document.

9. The apparatus of claim 8, wherein the at least one template is stored in the form of a structured image.

10. The apparatus of claim 1, further including:

a user interface, said user interface comprising a user input device responsive to a user selection and a display to depict the output document in conjunction with user selectable options;

wherein said computer further includes preprogrammed instructions to update the display in accordance with a selection of the user selectable options.

11. The apparatus of claim 10, wherein the programmable computer, in conjunction with the display, provide user selectable options to:

select at least one object in the output document;

alter at least one parameter of the selected object; and store, in memory, a version of the output document after a user has altered a parameter of at least one object therein.

12. The apparatus of claim 10, wherein the user selectable options are selected from the group consisting of:

inserting textual content into the output document;

defining a storage location for the output document;

storing the output document;

scaling the representation of the at least one object;

rotating the representation of the at least one object;

cropping the representation of the at least one object;

altering the colorization of the representation of the at least one object; and enhancing the representation of the at least one object.

13. A digital copying apparatus, including:

an image input device having a transparent platen, said image input device producing a single digitized image including representations of each of a plurality of undersized originals placed on the platen;

a programmable computer capable of controlling the operation of the digital copying apparatus and of processing the digitized image, said computer including a first memory for storing at least a portion of the digitized image and program memory for the storage of executable code suitable for causing said computer to execute image processing operations on the digitized image;

said computer, in accordance with preprogrammed instructions, determining a background of the digitized image, identifying the plurality of digitized undersized originals as objects within the digitized input image based on the determined background, determining boundaries of the plurality of objects, modeling shapes representing boundaries of each of the plurality of objects, and characterizing each of the plurality of objects by parameters including shape, position and orientation, and said computer automatically composing an output document including a representation of at least one of the plurality of objects;

a user interface, said user interface comprising a display to depict the output document and a plurality of user selectable option, wherein said computer further includes preprogrammed instructions to update the display in accordance with a selection of the user selectable options; and a printing engine to produce, in accordance with the output document, a substrate bearing marks in accordance with representations contained in the output document.

14. The digital copying apparatus of claim 13, wherein the digitized image is a color image and wherein the marks placed on the substrate are marks of at least two distinct colors.

15. The apparatus of claim 13, wherein said user interface comprises a user input device responsive to a user selection and a display to depict the output document in conjunction with user selectable options; and wherein said programmable computer further includes preprogrammed instructions to update the display in accordance with a selection of the user selectable options.

16. The apparatus of claim 15, wherein the programmable computer, in conjunction with the display, provide user selectable options to:

select at least one object in the output document;

alter at least one parameter of the selected object; and store, in memory, a version of the output document after a user has altered a parameter of at least one object therein.

17. The apparatus of claim 15, wherein the user selectable options are selected from the group consisting of:

inserting textual content into the output document;

defining a storage location for the output document;

storing the output document;

scaling the representation of the at least one object;

rotating the representation of the at least one object;

cropping the representation of the at least one object;

altering the colorization of the representation of the at least one object; and enhancing the representation of the at least one object.

* * * * *